United States Patent [19]

Meek

[11] Patent Number: 4,845,907
[45] Date of Patent: Jul. 11, 1989

[54] PANEL MODULE

[76] Inventor: John R. Meek, P.O. Box 622, R.R. 1, Crawfordsville, Ind. 47933

[21] Appl. No.: 138,220

[22] Filed: Dec. 28, 1987

[51] Int. Cl.$^4$ .................. B44D 5/08; E04F 11/16
[52] U.S. Cl. ................................ 52/177; 52/581; 404/41
[58] Field of Search ................ 52/177, 581, 593, 594, 52/591; 404/41

[56] References Cited

U.S. PATENT DOCUMENTS

| 2,315,448 | 3/1943 | Nagin | 52/581 |
| 2,323,271 | 6/1943 | Barry | 52/581 |
| 2,333,554 | 11/1943 | Prince | 52/581 |
| 3,172,508 | 3/1965 | Doering | 404/41 |
| 3,960,375 | 6/1976 | Bibi Roubi | 404/41 |
| 4,167,599 | 9/1979 | Nissineu | 404/41 |
| 4,584,221 | 4/1986 | Küng | 404/41 |

FOREIGN PATENT DOCUMENTS 2262347  6/1974  Fed. Rep. of Germany ........ 52/581

Primary Examiner—Henry E. Raduazo
Attorney, Agent, or Firm—Robert A. Spray

[57] ABSTRACT

A panel module having special support means by which adjacent and coplanar panels are effectively interlocked so that they are not relatively translated even by significant loading intermediately of their locations of external support. Thus a very lightweight panel nature may be provided, for ease of installation and removal, thus particularly beneficial for decking sections of an installation for such uses as poultry raising.

A lip-like wall is provided to extend horizontally from each of the upper and lower portions of an edge of one panel, and its adjacent panel is provided with a vertical wall which in installation nests snugly between the lip-like walls; and extra certainty and positiveness of the interlocking effect is provided by a hook-like formation of one of the lip-like walls.

20 Claims, 2 Drawing Sheets

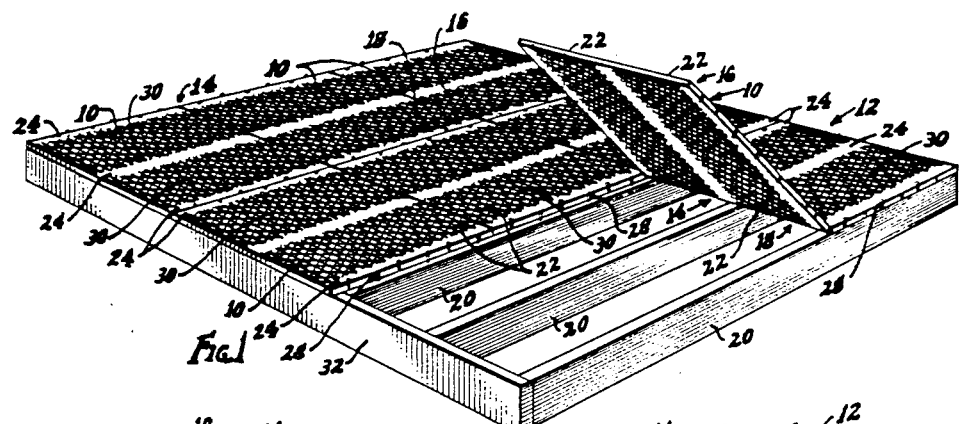
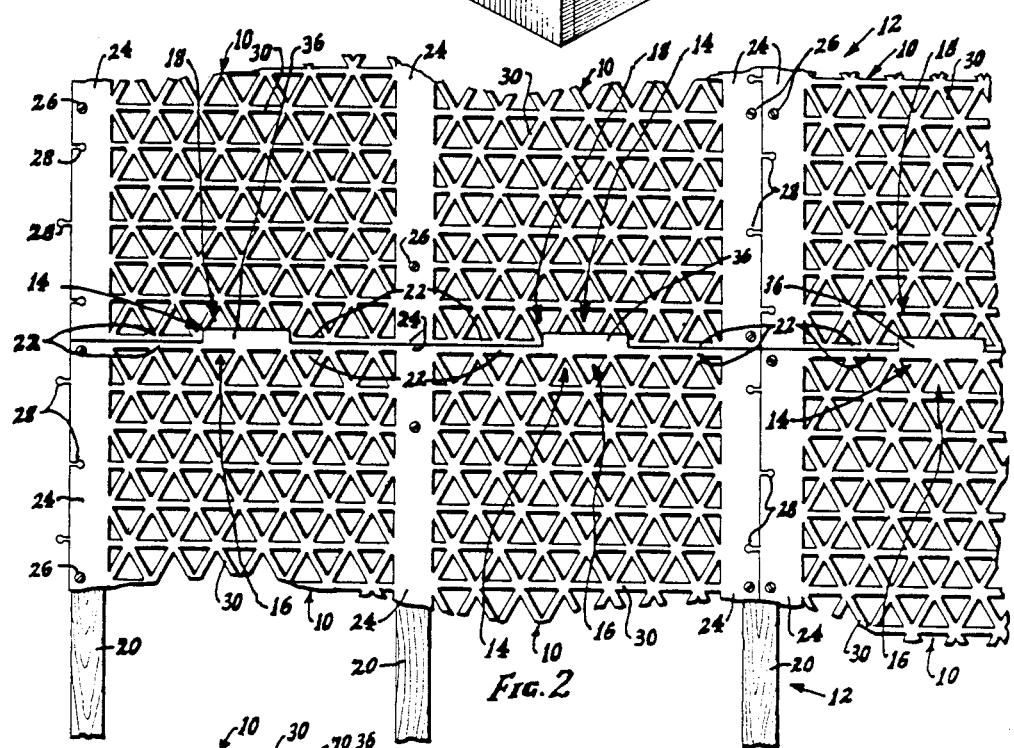
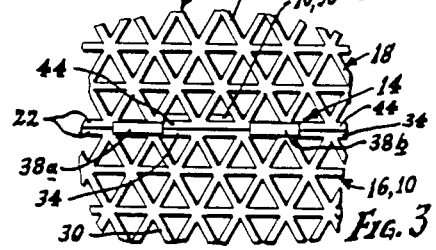

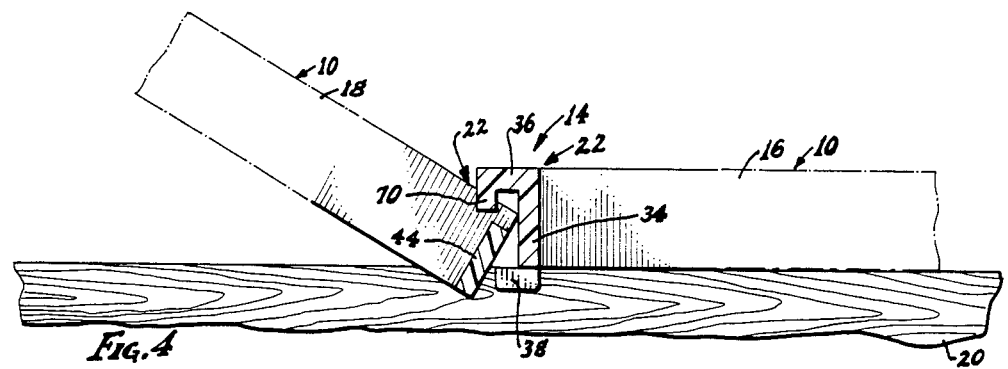
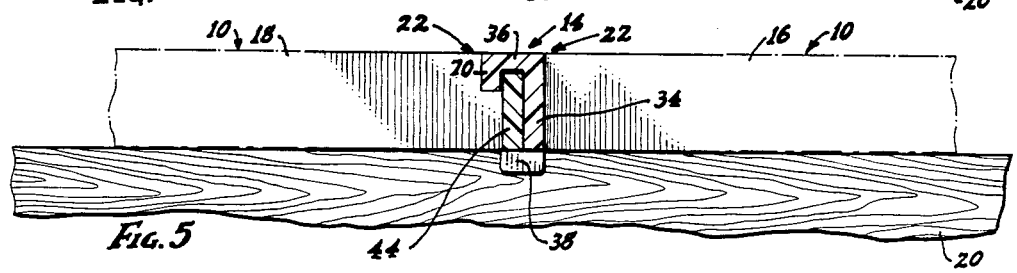
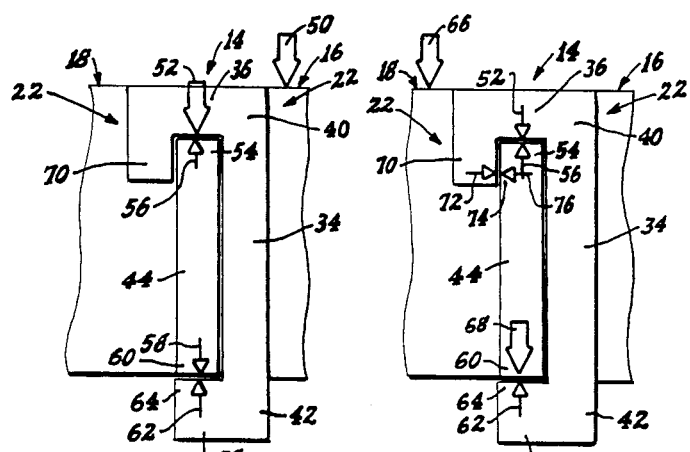

PANEL MODULE

FIELD OF THE INVENTION

The present invention relates to decks or decking, of and for a decking installation, and more particularly to a decking installation of a relatively light duty yet capable of sustaining some significant extra weight load conditions.

Even more particularly, the present invention relates to the provision of support concepts for the decking units of an installation of decking or flooring; and a particularly-envisioned use of the concepts is for support of deck modules of the decking installation for poultry raising or similar other uses in which animals are kept.

The raising of poultry, as a particular task and usage of decking and decking modules of the present invention, poses problems which are relatively unique in respect to other situations of use of support decking, these particular problems relating to details of that type of use.

That is, the decking for this type of animal life caretaking has to be of a sort of perforate nature to allow droppings to drop through the decking; and the modules need to be light enough to provide relative ease and convenience of temporary removal of the decking modules necessary from time to time in the care of such animate life. In contrast, the decking modules need to be amply sturdy to support the weight of a person or persones who from time to time will need to walk upon the decking.

Thus, in addition to the typical engineering needs of compromise between factors of weight, strength, movability, utility, durability, cost, etc., the problems of decking modules for such tasks as poultry raising require the quitecontrasting criteria of the strength of most deckings-yet much lighter weight than most decking.

Prior art structures do not provide the particular advantages and characteristics here achieved:

In considering the nature of the joint features of the paneling, and their concepts, and the inventive nature of the present concepts over prior art paneling as known to the inventor, it is not only conceded but emphasized that there are prior art panels which are light in weight and prior art panels which are quite rigid and strong. However, structures are not known which would provide the particular advantage of extreme lightness yet nevertheless also the advantage of avoiding relative translation at a joint, at least none of this nature, firmly interlocking panel edges between locations of external support.

THE PRESENT IVNENTION, SUMMAZRIZED

It is against the background of such prior art, which is disadvantageous for the particular and rather unique needs of poultry raising, as contrasted to advantages here shown to be achieved by the present concepts, that the present panel formation concepts are to be considered.

Especially providing advantage for such use as poultry raising, providing sufficient strength to avoid panel-edge separation under load yet extremely light in weight as desided for repeated installation and removal, the device comprises a plurality of co-operating panel lips or wall-like projections which snugly join adjacent panels, the panel lips being desirably and economically provided as integral extensions of the plastic panels themselves; and in the preferred embodiment here shown all the panels are formed integrally.

By the features thus summarized, and particularly by them in their effect as a combination, and integrally with the panels, and in contrast to the prior art known to the inventor and to what even by hindsight might be asserted as suggestions from the prior art, the present invention provides an advantageous apparatus for achieving the goal of a novel and useful decking installation of special characteristic and advantage.

Accordingly, although various separate concepts and components of the panel devices are conceded and emphasized to have been widely known in the prior art, and integral flanges are known for various products, nevertheless, the prior art not having had the particular concepts and details as here presented and as shown as different from the prior art, even only a fair amount of realistic humility, to avoid consideration of this invention improperly by hindsight, require the concepts here to be realistically viewed as inventive in their nature.

BRIEF DESCRIPTION OF THE DRAWINGS

The above description of the novel and advantageous deck-panel concepts of the present invention is of somewhat introductory and generalized form. More particular details, concepts, and features are set forth in the following and more detailed description of an illustrative embodiment, taken in conjunction with the accompanying drawings, which are of somewhat schematic and diagrammatic nature, for showing the inventive concepts of the present invention as are illustrated in this embodiment.

FIG. 1 is a perspective view of a nine-module decking section embodying panel modules according to the present invention, the view showing seven of the modules connected to a support frame, and one of the panel modules in an installation step in which it will lie along the rails of the frame;

FIGS. 2 and 3 are plan views, greatly enlarged over FIG. 1, of portions of the decking modules in assembled state; and more particularly:

FIG. 2 is a top or plan view of a portion of the decking section of FIG. 1, this view showing a portion of four of the panel modules interlocked together intermediately of their portions directly supported on frame ribs upon which the panel modules are seated and fastened;

FIG. 3 is a fragmental detail view of the bottom of a portion of a pair of the panel modules interlocked as per FIG. 2;

FIGS. 4 and 5, on a scale greatly enlarged over that of FIG. 2 and 3, are elevation views of section-portions embodying panel modules of the invention being mounted on a rail of the support frame, as per the decking sections shown in FIGS. 1-3, showing sequential stages of assembly; and more particularly:

FIG. 4 is a view to show an intermediate stage of the interlocking assembly of two adjacent ones of the panel modules, to particularly illustrate a step to achieve their interlocking assembly;

FIG. 5 is a view showing a subsequent stage in which the panel modules being joined in FIG. 4 are now firmly interlocked;

FIGS. 6 and 7, in considerably larger scale, are force diagrams of the interlocking connection components of the panel modules, projected to a common location intermediate the location of external supports, for indicating force vectors of load, reaction by the other panel, etc., showing vectors of force-transmission to illustrate the result that a deflection-causing load on one of the panel modules does not cause a relative deflection of either panel module with respect to the other; and more particularly:

FIG. 6 is a view to illustrate the forces involved in a deflection-causing load on one of the panel modules, but with the interlocking concepts of the present modules preventing a relative deflection of the two panel modules; and FIG. 7 is a view to illustrate the forces involved in a deflection-causing load on the other one of the panel modules, but with the interlocking concepts of the present modules preventing a relative deflection of the two panel modules.

DETAILED DESCRIPTION OF PREFERRED EMBODIMENT

As shown in the drawings, the present invention provides panel modules 10 particularly beneficial in making sections 12 of decking of an extremely lightweight decking nature for tasks such as poultry raising, for which extremely light weight is desired for ease of their needed moving of the decking sections 12 repeatedly, yet substantial strength is required for support of significant loads in between the locations of external support of the decking.

Thus, as shown, the invention provides novel panel-support joint means 14 for effectively achieving a panel joint which snugly interlocks adjacent panel modules 10, here referred in explanation as a first panel means 16 and second panel means 18, which are supported externally such as by the spaced joist-like ribs or rails 20 which support the panel means 16 and 18 so as to be adjacent one another and in coplanar relation.

Each panel module 10 desirably has support means of a first type and of a second type on opposite edges of the same panel module 10; but for explanation of the concepts the joinable portions of the two panels 10 here to be joined are referred to as a first panel means 16 and a second panel means 18 not only because they are two separate panels but because their parts which co-operate to make up the joint 14 are of different nature, as herein detailed.

The particularly advantageous functioning of the joint features of the panel-support means 16/18 is that they are operative to firmly hold together the adjacent edges 22 of the panels 10 throughout their edge portions intermediate their locations 24 of external support by the rails 20, and thereby prevent the separation of the panel edges 22 by translatory movement of the panels 10 (i.e., 16 and 18) with respect to one another out of their plane, i.e., relative translatory movement of the panel modules 10 and particularly their edge-portions 22 as would otherwise be caused by load-imposed flexure of one or both of the panels 10 and their edge portions 22 between their portions 24 supportingly engaging external support rails 20.

The external support of the panels 10, i.e., their portions 24 on rails 20, is shown made secure and immovable as by screws 26; and even more secure tightness of adjacent panels 10 along the span of the rails 20 is by their interfitting male and female portions 28.

With the panel-portions 24 thus tightly held to the rails 20 by screws 26, and the panel-portions 24 also locked along those portions 24 along the rails 20 by the fitting of parts 28, there can be no relative translatory movement of the panels 10 along the panel-portions 24, no matter how lightweight or even almost flimsy the panel modules 10 may be; and it is to be recalled that extreme lightness is particularly desired to facilitate the repetitive moving of the decking sections 12 especially in uses such as poultry raising.

Extreme lightness is also acceptable for the panel modules 10 even on non-edge areas 30 of the panels 10 between their portions 24 along the support rails 20; for the rails 20 (which are shown parallel and shown held at their ends by a transverse end-rails 32) are spaced close enough that there is sufficient rigidity in those non-edge panel areas 30, due to their beam nature as being in the nature of a "beam fixed at both ends," that the deflection of those mid-panel portions 30 is acceptable under reasonably expected or foreseeable loading situations, even with panel modules 10 of very light-weight and relatively shallow depth.

However, quite in contrast to the no-deflection situation of panel-portions 24 directly over the support rails 20, and in contrast also the small-deflection situation of the panel-portions 30 out in the panel-area away from the rails 20 but also away from the transverse panel edges 22, the light nature and low depth nature of desirably very light panel modules 10 poses a substantial problem of load-caused relative edge-portion deflection, i.e., relative translatory movement of the transverse panel edges 22 in the edge-span intermediate the panel-portions 24 which are over the support rails 20; and this relative translatory movement or relative deflection of adjacent mid-span panel edges 22 is the particular problem nicely solved by the novel concepts of the present invention.

More particularly, and according to the present invention, as shown in the drawings, the first one 16 of the panels 10 is provided to have a first wall means 34 generally perpendicular to the plane of the copanar panel means 10, and there is provided a second wall means 36 and a third wall means 38 (formed in the embodiment shown as of two spaced sections 38a and 38b) which respectively extend from vertically-spaced portions of wall 34, here as shown being respectively an upper portion 40 and a lower portion 42 of the first wall means 34, wall means 36 and 38 being generally parallel to the plane of the panel means 10; and the wall means 36 and 38 extend toward the panel which is the second panel means 18, in a generally "C" shape configuration of walls 34/36/38, when considered (FIGS. 4–7) as projected to be vertically aligned even though as mentioned herein the walls 34/36/38 have a horizontally-offset nature in a preferred embodiment.

Moreover as shown, the joint edge 22 of the second panel means 18 is provided with a wall means, here termed a fourth wall means 44, which is generally perpendicular to the plane of the panel means 18; and, at least throughout the span of the second wall means 36, the fourth wall means 44 is of a height (perpendicular to the plane of the second panel means 18) generally that of the distance between the second wall means 36 and the third wall means 38.

Considering the parts in an installation or assembly step (FIG. 4) in which the first panel means 16 is already affixed to rails 20 (by screws 26 although not shown in the fragmental showing of FIG. 4), and with the second panel means 18 partially installed, and then noting the parts in the assembled position or condition of FIG. 5, it will be seen from the "force diagrams" of FIGS. 6 and 7 that the invention provides that with the first panel means 16 and the second panel means 18 assembled, i.e., with the fourth wall means 44 and the first wall means 34 juxtaposed, and with the fourth wall means 44 operatively nested between the second wall means 36 and the third wall means 38 (assuming now that the second panel means 18 will then be screwed securely to the rail 20 so that the first panel means 16 and the second panel means 18 are held by the rails 20 as external means against movement of the panels 10 other than translatory movement with respect to one another out of their plane intermediate their positions 24 of external support), relative deflection or translatory movement of the two panels 10 is firmly blocked by the interfit of the walls 34/36/38/44; and this deflection-blocking is now more particularly described, with respect to flexure-causing load successively now described as imposed to each of the panels 16 and 18.

First (FIG. 6) considering an imposed flexure-causing load 50 onto the first panel means 16 between its positions 24 of external support, the load 50 will act as a force 52 on the first panel 16's second wall means 36, causing that second wall means 36 to bear onto the upper portion 54 of the fourth wall means 44; and since that fourth wall means 44 is a portion of the second panel means 18, the engagement of wall portions 36 and 54 blocks translatory movement of the first panel means 16 with respect to the second panel means 18, because the force 52 received and sustained by reaction force 56 at the upper portion 54 of wall 44 is carried through wall 44 to exert a similar force 58 (at lower portion 60 of wall 44) onto the lower (third wall means) wall 38 of the first panel means 16, the wall 38 reacting by force 62 in the upper portion 64 of the third wall means 38, all blocking any translatory movement of panel means 16/18 relative to one another.

Also, now observing the force diagram of FIG. 7, any flexure-causing load 66 onto the second panel means 18 between its positions 24 of external support will act on the fourth wall means 44 to cause its lower portion 60 to bear by force 68 (as did force 58 of the previous consideration) onto the upper portion 64 of the third wall means 38; and as in the previous consideration since wall 38 is a portion of the first panel means 16, the reaction force 62 of the wall 38 blocks against translatory movement of the second panel means 18 with respect to the first panel means 16.

In addition to the walls 34/36/38/44, in a preferred embodiment as shown the said second wall means 36 is provided to have a portion 70 extending generally parallel to the first wall means 34, the portion 70 providing a fifth wall means 70 which is spaced from the first wall means 34 only generally that of the thickness of the fourth wall means 44.

Also, preferably as shown, the fifth wall means 70 is provided to be of a length no more than about the thickness of the fourth wall means 44.

The wall portion 70 thus provides a hook-like member 70 under which (FIG. 4) can be passed the fourth wall means 44 in an assembly step; and the wall means 70 adds to the interlocking effect of the panel-edge joint 14 by the force analysis also shown in FIG. 7. That is, the hook-like fifth wall means 70 bears by a force 72 against the side 74 of the fourth wall means 44 in response to whatever rotational torque is imposed onto the third wall means 38 by the external load 66 onto the second panel means 18 (and thus upon its fourth wall means 44) as by the forces 68 and 62 of the above analysis, and by the sustaining of forces of 52/56, and with any force 72 of the hook-like fifth wall portion 70 being sustained by a reaction force 76 in the side 74 portion of the upper portion 54 of the fourth wall means 44.

Sturdiness of the joint 14 is also helped by the provision of the third wall means 38 being provided, as shown, to be lower than the plane of the first panel means 16, and, like those other wall means 34/36/44/70, being spaced from the position 24 of external support of the first panel means 16, this does not interfere with the position of the first panel means 16 against the external support means 20 even though wall means 38 is lower than the plane of the first panel means 16.

As shown in FIG. 3, the second wall means 36 is provided along a certain portion of the edge 22 of the first panel means 16, but rather than the third wall means 38 being directly under wall means 36, the third wall means 38 is provided along a portion which is horizontally offset therefrom, although of course along the panel edges 22 of the joint 14; and, in relation to that offset nature of walls 36/38, the fourth panel means 44 accomodatively cooperates with the offset nature of those walls 36/38 by the provision that the fourth panel means 44 has portions operatively engageable with both walls 36 and 38.

More particularly as shown the fourth wall means has its upper portion 54 along a portion of the second panel means 18, which portion 54 generally registers with the second wall means 36 of the first panel means 16, and the fourth wall 44 has its lower portion 60 along a portion of the second panel means 18 which generally registers with the third wall means 38 of the first panel means 16.

Those portions 54 and 60 of the fourth wall means 44, even though their portions which are operatively engageable with the offset set walls 76 and 38 are themselves correspondingly offset horizontally along the panel edge 22 of panel member 18, are made in the form shown as an elogated strip of uniform cross-section.

Even more particularly, in the form shown, the walls 36 and 38 are not only offset, but the third wall means 38 is provided to have its sections 38a and 38b spaced apart, one on each side of the portion of the adjacent edges 22 of the first panel means 16 and second panel means 18 at which is located the second wall means 36 and the upper portion 54 of the fourth wall means 44 which, as mentioned, generally registers with the second wall means 36.

In contrast to the nature of the third wall means 38 as being below the plane of the panels 10 (of the panel means 16 and 18), the second wall means 36 is provided to be within the limits of the plane of the first panel means 16, and the upper portion 54 of the fourth wall means 44 is sufficiently lower than the upper limits of the second wall means 36, that when the first panel means 16 and the second panel means 18 are assembled (See FIGS. 4 and 5), the second panel means 18 is coplanar with the first panel means 16.

CONCLUSION

It is thus seen that a decking panel, constructed and used according to the inventive concepts herein set forth, provides novel concepts of a desirable and advantageous product or device, yielding the advantages of a decking panel which provides special and particular advantages when used in decking which needs extreme lightness of weight for repeated movability yet considerable strength to sustain substantial loads without panel-edge separation by relative translatory panel-edge movement on panel-edge portions spaced from the decking's external supports.

In summary as to the nature of the overall product's advantageous concepts, their inventiveness is shown by novel features of concept and construction shown here in advantageous combination and by the novel concepts hereof not only being different from all the prior art known, but because the achievement is not what is or has been suggested to those of ordinary skill in the art, especially realistically considering this as a combination comprising components and concepts which individually are similar in nature to what is well known to most persons, surely including most of the many makers and users of panels decking in uses such as poultry-raising for many years, throughout the entire world. No prior art has suggested the modifications of any prior art to achieve the particulars of the novel concepts here achieved, with the special advantages which the overall concepts provide, even though by hindsight the solution here achieved may appear to be simple.

The difference of concept and construction are novel as specified herein, yielding advantages especially for easily-movable and easily-portable use, even though other deckings have been used for poultry-raising decking and other uses, and in spite of the fact that all concerned have surely known for many years that extreme lightness in weight was a goal, as was also the goal of high strength to avoid panel-edge separation under loading to be encountered. Yet, perhaps because those goals seemed to be so diverse and even mutually exclusive, no particular combination of prior art details as here presented in this overall combination has been suggested by the prior art, this achievement in its particular details thus being a substantial and advantageous departure from prior art, even though the prior art has had panels for a multiplicity of uses for many years. And particularly is the overall difference from the prior art significant when the non-obviousness is viewed by a consideration of the subject matter of this overall product as a whole, as a combination integrally incorporating features different from the prior art, in contrast to merely separate details of novelty themselves, and further in view of the prior art devices not achieving particular advantages here achieved by this combination.

Accordingly, it will thus be seen from the foregoing description of the invention according to this illustrative embodiment, considered with the accompanying drawings, that the present invention provides new and useful concepts of a novel and advantageous decking-panel product having and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

I claim:

1. A panel-support means for effectively interlocking a pair of first and second panel means which are supported externally so as to be adjacent one another and in coplanar relation, the panel-support means being operative to hold together the adjacent edges of the panel means intermediate their locations of external support to prevent their translatory movement with respect to one another out of their plane, as would otherwise be caused by load-imposed flexure of one or both of the panel means between their portions supportingly engaging external supports, the panel-support means comprising the following provisions:

a first one of the panel means having a first wall means generally perpendicular to the plane of the panel means, there being provided a second wall means and a third wall means, respectively extending from vertically-spaced portions of the said first wall means, generally parallel to the plane of the panel means, and extending toward the second panel means, the said second panel means being provided with a fourth wall means generally perpendicular to the plane of the panel means, and, at least throughout the span of the second wall means, is of a height perpendicular to the plane of the panel means generally that of the distance between the said second wall means and the third wall means of the first panel means, the arrangement providing that with the first panel means and the second panel means assembled with the said fourth wall means and the said first wall means juxtaposed, and with the said fourth wall means operatively nested between the said second wall means and the said third wall means, and the first panel means and the second panel means held by associated external means against movement other than translatory movement with respect to one another out of their plane intermediate their positions of external support, relative translatory movement of the first and second panel means is blocked as follows:

flexure-causing load onto the first panel means between its positions of external support will act on the said second wall means to cause it to bear onto the upper portion of the fourth wall means, which, being a portion of the second panel means, blocks such translatory movement of the first panel means with respect to the second panel means, and, flexure-causing load onto the second panel means between its positions of external support will act on the fourth wall means to cause it to bear onto the upper portion of the third wall means, which, being a portion of the first panel means, blocks such translatory movement of the second panel means with respect to the first panel means;

in a combination in which the second wall means is provided along a certain portion of the edge of the first panel means, and the third wall means is provided along a portion offset therefrom along the panel edges being interlocked;

and the fourth wall means is provided to have an upper portion along a portion of the second panel means generally registering with the second wall means of the first panel means, and to have a lower portion along a portion of the second panel means generally registering with the third wall means of the first panel means.

2. The invention as set forth in claim 1, in a combination which the projections of the said first wall means, the said second wall means, and the said third wall means are of a generally "C"-shape in vertical cross-section.

3. The invention as set forth in claim 1, in a combination in which the said second wall means is upwardly spaced from the third wall means and is provided to have a portion extending generally parallel to the first wall means, providing a fifth wall means which is spaced from the first wall means only generally that of the thickness of the fourth wall means, and of a height no more than about the thickness of the fourth wall means, thus providing a hook-like member under which can be passed the fourth wall means in an assembly step, and which adds to the interlocking effect by bearing against the side of the fourth wall means in response to whatever rotational torque is imposed onto the third wall means by external load onto the second panel means and thus its fourth wall means.

4. The invention as set forth in claim 2, in a combination in which the said second wall means is upwardly spaced from the third wall means and is provided to have a portion extending generally parallel to the first wall means, providing a fifth wall means which is spaced from the first wall means only generally that of the thickness of the fourth wall means, and of a height no more than about the thickness of the fourth wall means, thus providing a hook-like member under which can be passed the fourth wall means in an assembly step, and which adds to the interlocking effect by bearing against the side of the fourth wall means in response to whatever rotational torque is imposed onto the third wall means by external load onto the second panel means and thus its fourth wall means.

5. The invention as set forth in claim 1, in a combination in which the third wall means is provided to be lower than the plane of the first panel means, and spaced from the position of external support of the first panel means, and, being so spaced therefrom, does not interfere with the position of the first panel means against the external support means even though lower than the plane of the first panel means.

6. The invention as set forth in claim 2, in a combination in which the third wall means is provided to be lower than the plane of the first panel means, and spaced from the position of external support of the first panel means, and, being so spaced therefrom, does not interfere with the position of the first panel means against the external support means even though lower than the plane of the first panel means.

7. The invention as set forth in claim 3, in a combination in which the third wall means is provided to be lower than the plane of the first panel means, and spaced from the position of external support of the first panel means, and, being so spaced therefrom, does not interfere with the position of the first panel means against the external support means even though lower than the plane of the first panel means.

8. The invention as set forth in claim 4, in a combination in which the third wall means is provided to be lower than the plane of the first panel means, and spaced from the position of external support of the first panel means, and, being so spaced therefrom, does not interfere with the position of the first panel means against the external support means even though lower than the plane of the first panel means.

9. The invention as set forth in claim 1, in a combination in which the third wall means is provided to have two spaced sections, one on each side of the portion of the adjacent edges of the first panel means and second panel means at which is located the second wall means and and the upper portion of the fourth wall means which generally registers with the second wall means.

10. The invention as set forth in claim 3, in a combination in which the third wall means is provided to have two spaced sections, one on each side of the portion of the adjacent edges of the first panel means and second panel means at which is located the second wall means and and the upper portion of the fourth wall means which generally registers with the second wall means.

11. The invention as set forth in claim 5, in a combination in which the third wall means is provided to have two spaced sections, one on each side of the portion of the adjacent edges of the first panel means and second panel means at which is located the second wall means and and the upper portion of the fourth wall means which generally registers with the second wall means.

12. The invention as set forth in claim 1, in a combination in which the second wall means is provided to be within the limits of the plane of the first panel means, and the upper portion of the fourth wall means is sufficiently lower than the upper limits of the second wall means that when the first panel means and the second panel means are assembled as aforesaid the second panel means is coplanar with the first panel means.

13. The invention as set forth in claim 3, in a combination in which the second wall means is provided to be within the limits of the plane of the first panel means, and the upper portion of the fourth wall means is sufficiently lower than the upper limits of the second wall means that when the first panel means and the second panel means are assembled as aforesaid the second panel means is coplanar with the first panel means.

14. The invention as set forth in claim 5, in a combination in which the second wall means is provided to be within the limits of the plane of the first panel means, and the upper portion of the fourth wall means is sufficiently lower than the upper limits of the second wall means that when the first panel means and the second panel means are assembled as aforesaid the second panel means is coplanar with the first panel means.

15. The invention as set forth in claim 9, in a combination in which the second wall means is provided to be within the limits of the plane of the first panel means, and the upper portion of the fourth wall means is sufficiently lower than the upper limits of the second wall means that when the first panel means and the second panel means are assembled as aforesaid the second panel means is coplanar with the first panel means.

16. The invention as set forth in claim 10, in a combination in which the second wall means is provided to be within the limits of the plane of the first panel means, and the upper portion of the fourth wall means is sufficiently lower than the upper limits of the second wall means that when the first panel means and the second panel means are assembled as aforesaid the second panel means is coplanar with the first panel means.

17. The invention as set forth in claim 11, in a combination in which the second wall means is provided to be within the limits of the plane of the first panel means, and the upper portion of the fourth wall means is sufficiently lower than the upper limits of the second wall means that when the first panel means and the second panel means are assembled as aforesaid the second panel means is coplanar with the first panel means.

18. The invention as set forth in claim 3, in a combination in which the third wall means is provided to be lower than the plane of the first panel means, and spaced from the position of external support of the first panel means, and, being so spaced therefrom, does not interfere with the position of the first panel means against the external support means even though lower than the plane of the first panel means.

19. The invention as set forth in claim 3, in a combination in which the third wall means is provided to have two spaced sections, one on each side of the portion of the adjacent edges of the first panel means and second panel means at which is located the second wall means and and the upper portion of the fourth wall means which generally registers with the second wall means.

20. The invention as set forth in claim 5, in a combination in which the third wall means is provided to have two spaced sections, one on each side of the portion of the adjacent edges of the first panel means and second panel means at which is located the second wall means and and the upper portion of the fourth wall means which generally registers with the second wall means.

* * * * *